(12) United States Patent
Kern

(10) Patent No.: US 8,587,232 B2
(45) Date of Patent: Nov. 19, 2013

(54) SYSTEM AND METHOD FOR ALIGNING A RESTING ROTOR TO A KNOWN POSITION

(71) Applicant: Lynn R. Kern, Tucson, AZ (US)

(72) Inventor: Lynn R. Kern, Tucson, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

(21) Appl. No.: 13/746,420

(22) Filed: Jan. 22, 2013

(65) Prior Publication Data

US 2013/0134913 A1 May 30, 2013

Related U.S. Application Data

(62) Division of application No. 12/620,679, filed on Nov. 18, 2009, now Pat. No. 8,378,602.

(51) Int. Cl.
*H02P 1/04* (2006.01)

(52) U.S. Cl.
USPC ............ 318/400.09; 318/400.01; 318/400.11; 318/400.32; 318/700

(58) Field of Classification Search
USPC ............. 318/400.01, 400.09, 400.11, 400.32, 318/700
See application file for complete search history.

(56) References Cited

U.S. PATENT DOCUMENTS

| 4,259,630 | A | 3/1981 | Killian | 318/807 |
|---|---|---|---|---|
| 4,509,004 | A | 4/1985 | Shepard, Jr. | 318/801 |
| 4,510,422 | A | 4/1985 | Ogura | 318/400.1 |
| 4,678,973 | A | 7/1987 | Elliott et al. | 318/400.11 |
| 4,779,034 | A | 10/1988 | Shepard, Jr. | 318/804 |
| 5,017,845 | A | 5/1991 | Carobolante et al. | 318/400.11 |
| 5,198,733 | A | 3/1993 | Wright | 318/400.34 |
| 5,315,225 | A | 5/1994 | Heinrich et al. | 318/712 |
| 5,343,127 | A | 8/1994 | Maiocchi | 318/400.11 |
| 5,350,984 | A | 9/1994 | Carobolante et al. | 318/400.32 |
| 5,397,972 | A | 3/1995 | Maiocchi | 318/400.11 |
| 5,455,885 | A | 10/1995 | Cameron | 388/834 |
| 5,572,097 | A | 11/1996 | Cameron | 318/400.11 |
| 5,668,449 | A | 9/1997 | Carobolante | 318/400.09 |
| 5,818,192 | A | 10/1998 | Nozari | 318/609 |
| 6,100,656 | A | 8/2000 | El-Sadi et al. | 318/400.11 |
| 6,512,342 | B2 | 1/2003 | Kawagoshi | 318/400.1 |
| 6,639,371 | B2 | 10/2003 | Walters et al. | 318/400.11 |
| 6,995,530 | B2 | 2/2006 | Biamonte et al. | 318/400.33 |
| 7,202,623 | B2 | 4/2007 | Zhou et al. | 318/400.11 |

(Continued)

OTHER PUBLICATIONS

"Brushless DC Motor Drive Circuit—TDA5140A," Philips Semiconductors, 24 pages, Apr. 1994.

(Continued)

*Primary Examiner* — Kawing Chan
(74) *Attorney, Agent, or Firm* — King & Spalding L.L.P.

(57) ABSTRACT

A system and method are presented for aligning a rotor in a motor. The motor may include the rotor and a plurality of pairs of electromagnets. One or more pairs of electromagnets may be excited at a first excitation level. The one or more pairs of electromagnets may be less than all of the plurality of pairs of electromagnets. The excitation of the one or more pairs of electromagnets may be increased to a second excitation level over a first period of time. The excitation of the one or more pairs of electromagnets may be decreased to a third excitation level over a second period of time. Exciting the one or more pairs of electromagnets, increasing the excitation, and decreasing the excitation may cause the rotor to stop in a known position.

21 Claims, 6 Drawing Sheets

(56) References Cited

U.S. PATENT DOCUMENTS

| | | | | |
|---|---|---|---|---|
| 2001/0048278 | A1 | 12/2001 | Young et al. | 318/400.29 |
| 2004/0061467 | A1* | 4/2004 | Liu et al. | 318/463 |
| 2004/0232864 | A1* | 11/2004 | Sunaga et al. | 318/434 |
| 2005/0269985 | A1* | 12/2005 | Yoshitomi et al. | 318/471 |
| 2006/0125439 | A1* | 6/2006 | Ajima et al. | 318/716 |
| 2006/0284581 | A1* | 12/2006 | Mullin et al. | 318/362 |
| 2011/0115421 | A1* | 5/2011 | Kern et al. | 318/400.11 |
| 2011/0291597 | A1* | 12/2011 | Kern et al. | 318/400.11 |
| 2012/0007526 | A1* | 1/2012 | Tsai et al. | 318/3 |

OTHER PUBLICATIONS

"Sensorless Spindle Motor Controller—ML4411/ML4411A," Micro Linear, 15 pages, May 1997.

"Brushless Motor Driver with Speed Control for Portable Cassette Recorders—LB1877V," Sanyo, 7 pages, 1999.

Berringer, Ken et al., "Sensorless Brushless DC Motor Using the MC68HC908MR32 Embedded Motion Control Development System—AN1858," Freescale Semiconductor, 36 pages, 2004.

"Sensorless Brushless DC Motor Control with Z8 Encore! MC Microcontrollers—AN022601-0905," ZiLOG, 64 pages, 2005.

"Sensorless Brushless DC Motor Reference Design—AN208," Silicon Labs, 40 pages, 2006.

"Sensorless Motor Control IC for Appliances—IRMCF371," International Rectifier, 30 pages, Dec. 5, 2006.

Zambada, Jorge, "Sensorless Field Oriented Control of PMSM Motors—AN1078," Microchip, 30 pages, 2007.

"Fan Motor Driver—LV8800V," Sanyo, 8 pages, Aug. 2007.

* cited by examiner

SYSTEM AND METHOD FOR ALIGNING A RESTING ROTOR TO A KNOWN POSITION

PRIORITY CLAIM

This application is a divisional patent application of U.S. patent application Ser. No. 12/620,679 titled "System and Method for Aligning a Rotor to a Known Position" filed Nov. 18, 2009, whose inventor is Lynn R. Kern, which is hereby incorporated by reference as though fully and completely set forth herein.

INCORPORATION BY REFERENCE

U.S. patent application Ser. No. 12/393,996 titled "Brushless, Three Phase Motor Drive", filed on Feb. 26, 2009, whose inventors are Lynn R. Kern and James P. McFarland, is hereby incorporated by reference as though fully and completely set forth herein.

U.S. patent application Ser. No. 12/620,656, titled "System and Method for Inducing Rotation of a Rotor in a Sensorless Motor", filed on Nov. 18, 2009, whose inventors are Lynn R. Kern and James P. McFarland, is hereby incorporated by reference as though fully and completely set forth herein.

U.S. patent application Ser. No. 12/620,726, titled "Brushless, Three Phase Motor Drive", filed on Nov. 18, 2009, whose inventors are Lynn R. Kern, Scott C. McLeod, and Ken Gay, is hereby incorporated by reference as though fully and completely set forth herein.

FIELD

The invention generally relates to DC (Direct Current) motors used in various applications, such as hard disk drive motors, cooling fans, drive motors for appliances, etc.

DESCRIPTION OF THE RELATED ART

An electric motor uses electrical energy to produce mechanical energy. Electric motors are used in a large number of applications, including a number of different household appliances, pumps, cooling fans, etc. Motors can generally be classified as either alternating current (AC) motors or direct current (DC) motors.

Motors generally include a rotor, which is the non-stationary (moving) part of the motor, and a stator, which is the stationary part of the motor. The stator generally operates as a field magnet (e.g., electromagnet), interacting with an armature to induce motion in the rotor. The wires and magnetic field of the motor (typically in the stator) are arranged so that a torque is developed about the rotor's axis, causing rotation of the rotor. A motor typically also includes a commutator, which is an electrical switch that periodically reverses the current direction in the electric motor, helping to induce motion in the rotor. The armature carries current in the motor and is generally oriented normal to the magnetic field and the torque being generated. The purpose of the armature is to carry current crossing the magnetic field, thus creating shaft torque in the motor and to generate an electromotive force ("EMF").

In a typical brushed DC motor, the rotor comprises one or more coils of wire wound around a shaft. Brushes are used to make mechanical contact with a set of electrical contacts (called the commutator) on the rotor, forming an electrical circuit between the DC electrical source and the armature coil-windings. As the armature rotates on axis, the stationary brushes come into contact with different sections of the rotating commutator. The commutator and brush system form a set of electrical switches, each firing in sequence, such that electrical-power always flows through the armature coil closest to the stationary stator (permanent magnet). Thus an electrical power source is connected to the rotor coil, causing current to flow and producing electromagnetism. Brushes are used to press against the commutator on the rotor and provide current to the rotating shaft. The commutator causes the current in the coils to be switched as the rotor turns, keeping the magnetic poles of the rotor from ever fully aligning with the magnetic poles of the stator field, hence maintaining the rotation of the rotor. The use of brushes creates friction in the motor and leads to maintenance issues and reduced efficiency.

In a brushless DC motor design, the commutator/brushgear assembly (which is effectively a mechanical "rotating switch") is replaced by an external electronic switch synchronized to the rotor's position. Brushless DC motors thus have an electronically controlled commutation system, instead of a mechanical commutation system based on brushes. In a brushless DC motor, the electromagnets do not move, but rather the permanent magnets rotate and the armature remains static. This avoids the problem of having to transfer current to the moving armature. Brushless DC motors offer a number of advantages over brushed DC motors, including higher efficiency and reliability, reduced noise, longer lifetime (no brush erosion), elimination of ionizing sparks from the commutator, and overall reduction of electromagnetic interference (EMI).

One technique used to reduce the power required in some applications has been the introduction of Three Phase Brushless Motors. The typical configuration for these motors is shown in FIG. 1. The drive electronics for these motors typically rely on Hall elements (Hall effect sensors) to detect the absolute position of the rotor at all times, and switch drive transistors to maintain motor rotation. A Hall effect sensor is a transducer that varies its output voltage in response to changes in magnetic field. The motors are often electrically connected in a "Y" configuration, so named due to the resemblance to the letter "Y". The common point for the three coils is connected to the electrical source, and the drive electronics switch the drive transistors to maintain the rotating electromagnetic field required to turn the motor.

A second method requires the use of six (6) drive transistors. In this configuration, one high-and low-side pair are on at any point in time, completing the electrical circuit through two of the three legs of the motor. Using the un-energized coil as a magnetic sensor to determine the rotor position is known as Back Electro-Motive Force (BEMF) detection. The motivation for this technique is the elimination of the relatively expensive Hall elements and associated electronics. BEMF commutation techniques have successfully been applied to a wide-range of motors.

One issue that arises when using BEMF detection is that if the rotor is not moving, there is no BEMF to be detected. This means there must be a special technique for inducing rotation of the rotor until the rotational speed is sufficient to detect a BEMF signal. Since there is no feedback to determine the exact position of the rotor, the stator coils must be energized such that the rotor moves to a known, predictable location. This is essential to starting the motor with high reliability.

Open literature describes two techniques for aligning the rotor. The first attempts to lock the commutation frequency to a reference oscillator from the initial rotation. The second method uses a ramping PWM duty cycle or ramping linear voltage to align the rotor, followed by a delay time to ensure the rotor is at the pre-determined position. This position varies from 0-30 degrees offset from the commutation point. Both of these techniques leave much to be desired.

Most of these solutions reach 100% PWM duty cycle (or maximum voltage for linear applications) for an extended period of time to align the motor. This is an energy intensive way to align a rotor, and has the potential to damage motor windings. It is also known that slight movements of the rotor may occur when maximum voltage is applied to the coils, then switched off. Some solutions implement complex control loops in order to align the rotor. Many solutions rely on the classic Park and Clarke transforms to determine position, and require microcontrollers to evaluate the mathematics. Improvements in rotor alignment techniques that address some or all of these problems would be desirable.

In addition, motor braking techniques typically do not consider the possibility of placing the rotor in a position conducive to the next start-up sequence. The industry standard solution is to perform one of two operations: either to connect all three phases to the common point, or to connect all three phases to ground. This makes the restart sequence more complicated and more prone to stalling conditions, as the exact rotor location in unknown. Improvements in motor braking techniques would therefore also be desirable.

When cooling any computing platform, power is necessarily consumed to remove heat produced by other components in the system. Traditionally, this has not been a large concern, as the platforms consumed much more power than the fan used in removing the heat. As the power consumption of all platforms is reduced, the cooling system consumes power that could either be used to extend battery life in laptops, or to reduce the carbon footprint of server systems. Therefore, improvements in motors used in cooling systems are also desired.

SUMMARY

Various embodiments are presented of a system and method for aligning a rotor in a motor. The motor may be an electronic motor, and may include a rotor having one or more permanent magnets. The one or more permanent magnets may be physically positioned in- or out-board of the stationary section of the motor, referred to as the stator, which may include a plurality of pairs of electromagnets. In some embodiments, the motor may be a three phase motor, and the plurality of pairs of electromagnets may include three pairs of electromagnets.

The system may include logic for controlling the operation of the motor. The logic may be analog or digital, e.g., the logic may include one or more state machine based controllers or one or more application specific integrated circuits. The motor may instead (or in addition) include a processor, such as a microcontroller, and a computer accessible memory medium storing program instructions executable to control the motor. The processor may be configured to execute program instructions from the memory medium to control the motor.

The logic may be configured to align the rotor to a known position. The logic may be configured to perform some or all of the steps of one or more of the methods described below.

In a first set of embodiments, a method may operate to align the rotor when the rotor is initially stationary. In other words, when the method is initiated, the rotor may not be rotating. One or more pairs of electromagnets of the plurality of pairs of electromagnets in the motor may be excited at a first excitation level. In some embodiments, the one or more pairs of electromagnets may be less than all of the plurality of pairs of electromagnets; for example, in some embodiments, only a first pair of electromagnets may be excited.

The excitation of the one or more pairs of electromagnets may be increased to a second excitation level over a first period of time. The second excitation level may be a higher excitation level than the first excitation level. In some embodiments, increasing the excitation level may include incrementing the excitation level of the one or more pairs of electromagnets through one or more intermediate excitation levels over the first period of time.

The excitation of the one or more pairs of electromagnets may be decreased to a third excitation level over a second period of time. The third excitation level may be a lower excitation level than the second excitation level. In some embodiments, decreasing the excitation level may include decrementing the excitation level of the one or more pairs of electromagnets through one or more intermediate excitation levels over the second period of time.

Exciting the one or more pairs of electromagnets, increasing the excitation level to the second excitation level, and decreasing the excitation level to the third excitation level may cause the rotor to stop in a known position. In various embodiments, the excitations may be pulse-width modulated excitations, or may be linear voltage driven excitations. In other words, in some embodiments, the first, second, and third excitation levels may be percentages of a maximum pulse-width modulation duty cycle, or linear voltages.

In a second set of embodiments, a method may operate to stop and align the rotor when the rotor is initially rotating. In other words, when the method is initiated, the rotor may be rotating. One or more pairs of electromagnets of the plurality of pairs of electromagnets in the motor may be excited at a first excitation level. In some embodiments, the one or more pairs of electromagnets may be less than all of the plurality of pairs of electromagnets, for example, in some embodiments, only a first pair of electromagnets may be excited. The one or more pairs of electromagnets may be excited at the first excitation level for a first period of time.

The excitation of the one or more pairs of electromagnets may be decreased to a second excitation level over a second period of time. The second excitation level may be a lower excitation level than the first excitation level. In some embodiments, decreasing the excitation level may include decrementing the excitation level of the one or more pairs of electromagnets through one or more intermediate excitation levels over the second period of time.

Exciting the one or more pairs of electromagnets and decreasing the excitation level to the third excitation level may cause the rotor to stop in a known position. In various embodiments, the excitations may be pulse-width modulated excitations, or may be linear voltage driven excitations. In other words, in some embodiments the first and second excitation levels may be percentages of a maximum pulse-width modulation duty cycle, or may be linear voltages.

The above methods provide significantly greater motor performance, e.g., increased efficiency, as compared to prior art designs. In particular, the above methods more accurately place the rotor in a known position, in a way that requires less power than prior art solutions. In addition, the method is simple enough that it can be implemented as part of a more compact and efficient control mechanism design, which further reduces overall power usage.

Figure 1A:
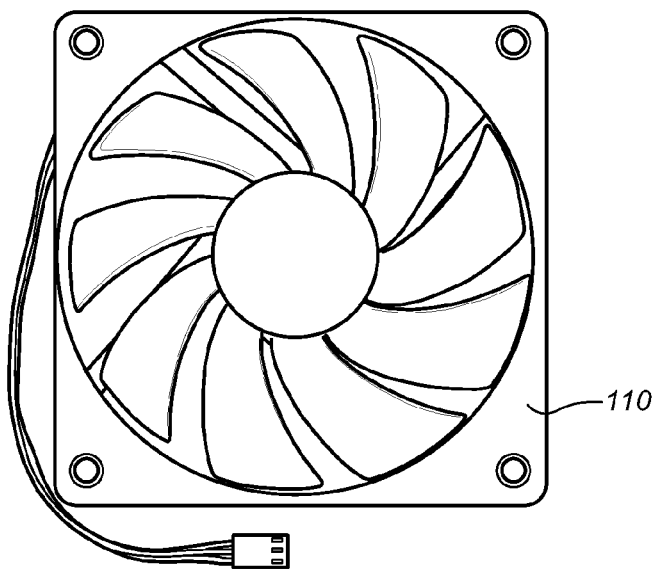
FIGS. 1A and 1B illustrate different views of an exemplary fan and fan motor according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1B:
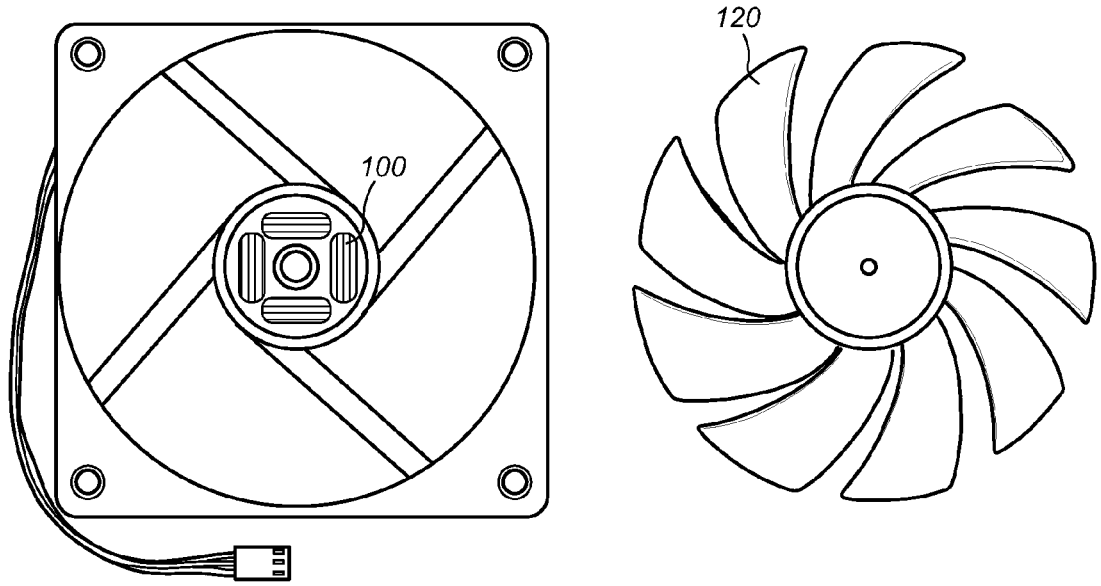

FIGS. 1A and 1B—Exemplary Fan and Fan Motor

FIGS. 1A and 1B illustrate an exemplary fan assembly 110 according to one embodiment. The fan 110 may be a cooling fan, for example a fan for use in a laptop or a desktop computer. The fan 110 may alternatively be a commercial or industrial fan, or in general any type of fan driven by a motor. The fan assembly 110 may include a motor assembly 100 as well as fan blades 120. The motor assembly 100 may comprise a motor (102, FIG. 2) as well as drive circuitry (402 FIG. 4) for controlling the motor 102.

Although FIGS. 1A and 1B illustrate a fan as the load being driven by the motor, it should be noted that the system and method for aligning a rotor to a known position as described herein may be suited for driving any of various types of loads, including without limitation hard disk drives, drive motors for appliances, propellers, wheels, pumps, or other loads.

Figure 2:
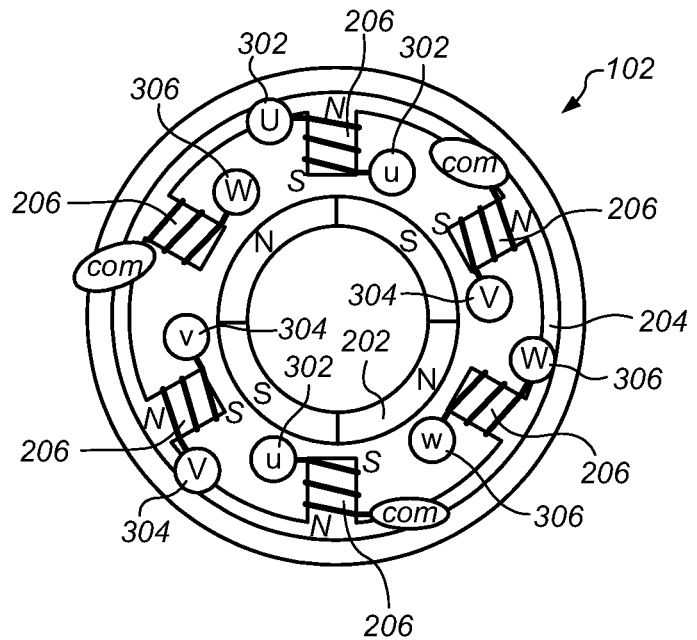
FIG. 2 illustrates a simplified diagram of a brushless four-pole three-phase electric motor according to one embodiment.

FIG. 2—Brushless Four-Pole Three-Phase Motor

FIG. 2 illustrates a simplified diagram of an exemplary brushless four-pole three-phase motor 102. The motor 102 may be electrically powered, e.g., by direct current (DC) electricity. The motor may also be electronically controlled. The motor 102 may include a rotor 202, which may include one or more permanent magnets. The rotor 202 may have four poles, as shown. Alternatively, the rotor 202 may include two, six or another number or poles. The motor may include a stator 204 comprised around the rotor 202, which may include a plurality of electromagnets 206. There may be six electromagnets 206, which may be arranged at equal spacing around the stator 204. The electromagnets 206 may be arranged as three pairs of electromagnets, such that each pair of electromagnets may variously be powered in different phases than the other pairs. The three pairs of electromagnets 206 may be connected in a "Y" configuration. Thus the motor 102 may be a three phase motor. The motor 102 may be brushless, e.g., may not include any brushes connecting current to the rotor 202. Additionally, the motor 102 may be sensor-less, e.g. may not include a discrete rotor position sensing mechanism such as one or more Hall sensors. While the motor is operating, two of the three pairs of electromagnets on the stator 204 may be driven to induce or maintain rotation of the rotor 202 at any given time. The motor 102 may then utilize one of the undriven electromagnets of the stator 204 to indirectly detect the position of the rotor 202. Since the indirect detection of the rotor's 202 position can only occur when the rotor is already spinning, one or more special techniques may be used to place the rotor in a known position and/or force the rotor to begin rotating even without knowledge of the rotor's exact position. The present disclosure relates primarily to such techniques for placing the rotor in a known position. Application Ser. No. 12/620,656, titled "System and Method for Inducing Rotation of a Rotor in a Sensorless Motor", which is incorporated by reference above, discusses techniques for forcing the rotor to begin rotating (e.g., once the rotor has been placed in a known position) in greater detail.

The phases of the stator 204 may be driven in a pattern ideally configured to induce rotation of the rotor 202. The polarity of the electromagnets 206 may be periodically commutated as part of this pattern.

Figure 3:
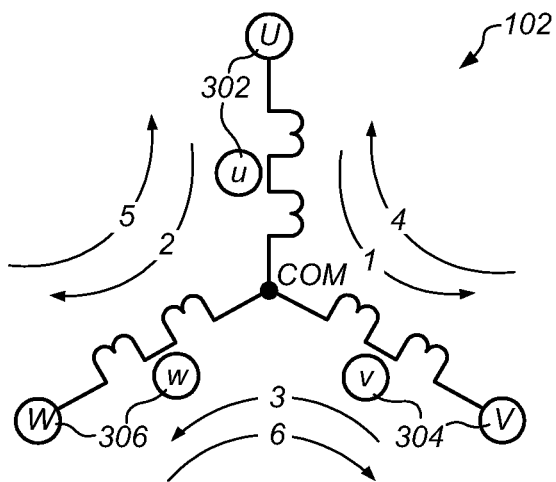
FIG. 3 illustrates a commutation pattern of a brushless three phase electric motor according to one embodiment.

FIG. 3—Commutation Pattern of a Brushless Three-Phase Motor

FIG. 3 illustrates a simplified circuit diagram depicting a commutation pattern of a brushless three phase motor according to one embodiment. It should be noted that while commutation patterns and timing may be important to various phases of operation of a brushless, three-phase DC motor, the present disclosure primarily refers to phases of motor operation (e.g., motor braking and rotor alignment) which may not involve commutation. FIG. 3 and the description provided below with respect thereto is thus provided primarily for completeness.

The motor 102 may be a brushless, three-phase DC motor as described above. The electromagnets 206 may be connected in a "Y" configuration as shown. The motor 102 may also be a sensor-less motor as described above, e.g. may utilize an undriven stator electromagnet to indirectly detect the position of the rotor (or the motor 102 may include Hall sensors). The motor 102 may determine the timing of each commutation of the commutation pattern according to any of various techniques; for example, in the natural commutation phase of operation, a technique according to an embodiment described in application Ser. No. 12/393,996, titled "Brushless, Three Phase Motor Drive", which is incorporated by reference above, could be used. To control rotation of the rotor 202, two pairs of the electromagnets on the stator 204 may be driven at any one time.

A given pair may be driven on the 'high side' or the low side', indicating in which direction current is being run through the windings of that pair of electromagnets. Depending on the number of poles in the rotor, the electromagnets of a pair may be wound in the same direction or in opposite directions. For example, with a four pole rotor (as shown in FIG. 2), the windings may be configured such that the opposite sides of an electromagnet pair may present the same polarity (e.g., 'S') to the rotor, while with a two pole rotor, the windings may be configured such that the opposite sides may present opposing polarity (e.g., one 'S', one 'N'). Thus in some cases the convention used to define the polarities indicated by 'high side' and 'low side' may depend on the rotor magnetics. Other naming and/or driving conventions may also be possible.

A commutation cycle may include six phases. The phases may correspond to the numbered arrows in FIG. 3. In FIG. 3, each arrow points from the high side driven pair to the low side driven pair. Thus for example, '1' may indicate that in the first phase of the cycle, the 'U' pair 302 of electromagnets may be driven on the high side, while the 'V' pair 304 of electromagnets may be driven on the low side, while the 'W' pair 306 of electromagnets may remain undriven. '2' then would indicate that in the second phase of the cycle, the 'U' pair 306 may again be driven on the high side, while the 'W' pair 304 may be driven on the low side, and the 'V' pair 302 may be undriven. Each of the remaining numbered phases would operate in a similar manner to create a full commutation cycle which could be repeated to increase, maintain, or otherwise affect rotation of the rotor.

If the motor 102 is a DC powered motor, rotational speed may be controlled by means of pulse width modulation (PWM) of the electromagnets. Generally speaking, as regards controlling rotation of the rotor, a PWM duty cycle may indicate how fast the rotor 202 should rotate. More specifically the PWM duty cycle may specify how often and with how much power to drive the electromagnets of the stator. Alternatively, direct linear voltages may be used to excite the coils of the electromagnets, in some embodiments.

Figure 4:
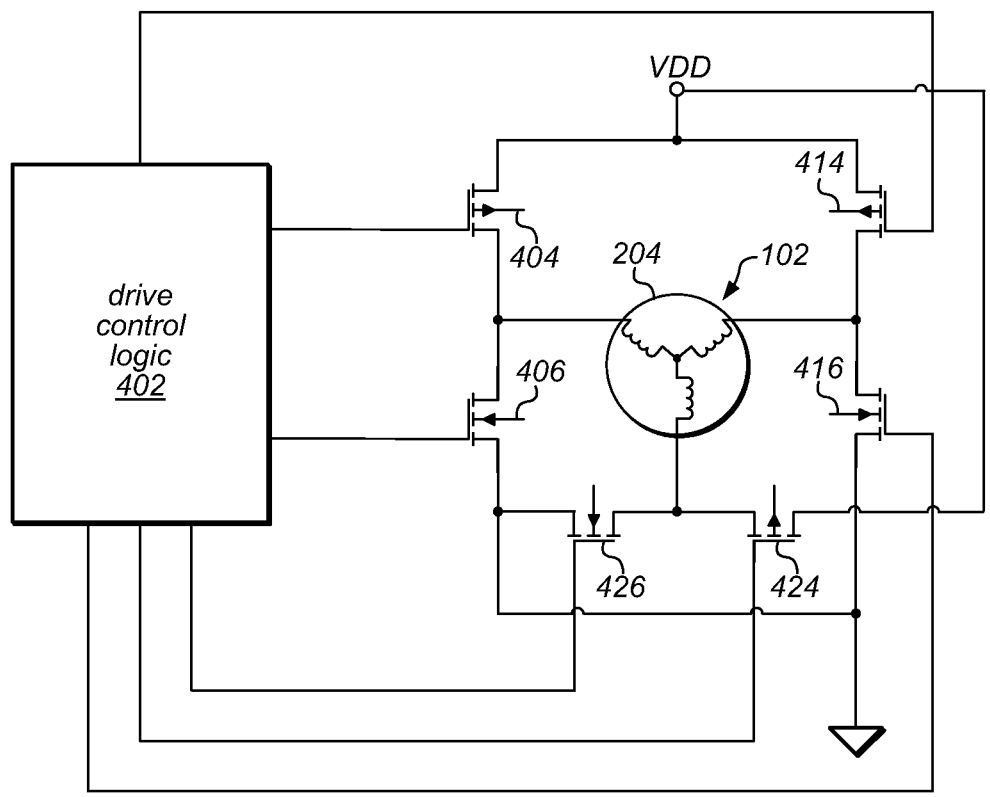
FIG. 4 is a circuit diagram of a motor with drive control logic according to one embodiment.

FIG. 4—Circuit Diagram of a Motor with Drive Control Logic

FIG. 4 illustrates a simplified circuit diagram of a motor and its drive control logic 402. The motor may be a sensorless, brushless, three-phase motor as described above and illustrated in the various Figures. As shown, the motor may include a stator 204, which may include three pairs of electromagnets. Each pair of electromagnets may have a corresponding pair of transistors, e.g., field effect transistors (FETs). The transistors may be configured such that each pair of electromagnets is effectively bipolar, e.g., the polarity may be reversible. In other words, for each electromagnet pair, one transistor may drive the pair on the high side, or the other transistor may drive the pair on the low side. For example, FET 404 may be the high side transistor for the 'U' pair 302, while FET 406 may be the low side transistor for the 'U' pair of electromagnets 302. Similarly, FETs 414, 416 may be the respective high and low side transistors for the 'V' pair of electromagnets 304, while FETs 424, 426 may be the respective high and low side transistors for the 'W' pair of electromagnets 306. In addition to the particular embodiment shown, any number of other wiring configurations (e.g. using a different number or type of transistor) may also be possible.

The transistors for each pair of electromagnets may be controlled by drive control logic 402. The drive control logic 402 may be electronic logic configured to perform various operations as described herein, such as exciting one or more of the pairs of electromagnets, at various excitation levels, in order to stop and/or place the rotor in a known position. In addition to any braking and/or rotor alignment related functions, the drive control logic 402 may have logic for controlling the motor under other conditions; for example, the drive control logic 402 may include logic for a forced commutation operation to begin rotation of the rotor; logic for controlling steady state or natural commutation operation of the motor; logic for determining if a stall condition exists; and/or logic for other functions, as well as logic for switching from one function to another at an appropriate time.

In some embodiments, the drive control logic 402 may also receive signals from one or more outside control devices, such as a fan speed control device. Other outside control devices are also envisioned. Alternatively, such control devices may be incorporated into the drive control logic 402 itself.

The drive control logic 402 itself may be any of various types of logic, e.g., analog or digital, or a combination thereof. For example, the drive control logic 402 may be implemented as a processor, e.g. a microcontroller, executing instructions comprised on a memory medium; a state-machine based digital controller; a Field Programmable Gate Array (FPGA) and/or a mixed signal application specific integrated circuit (ASIC). Alternatively, the drive control logic 402 may include any combination of the above. The drive control logic may thus be implemented using any of various digital or analog techniques, or a combination thereof, as would be apparent to one of ordinary skill in the art.

Figure 5:
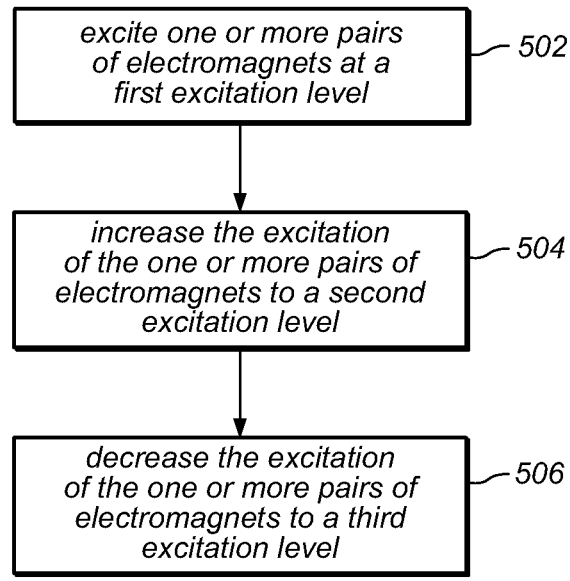
FIG. 5 is a flowchart diagram describing a method for aligning a rotor in a motor according to one embodiment.

FIG. 5—Flowchart Illustrating a Method for Aligning a Rotor in a Motor

FIG. 5 illustrates a method for aligning a rotor in a motor according to one embodiment. Embodiments of the method described below may be particularly suitable for implementation in a sensorless, brushless, three phase DC electric motor. For example, as described above, in such a motor it may not be possible to detect the position of the rotor until the rotor is already spinning Thus, a special technique, such as described below, may be used to place the rotor in a known position, which may then allow for a forced commutation technique to be used to force the rotor to begin rotating until sufficient rotational velocity has been built up to detect a BEMF. However, although the method described below may be particularly suitable in such a sensorless motor, it will be apparent that the technique may also be used in other types of motors if desired. That is to say, in many cases initiating rotation may be performed more efficiently if the rotor begins in a particular, known position, for a variety of types of motor.

The motor 102 may be a brushless, three-phase motor as described above and illustrated in the various Figures. The motor 102 may thus include a rotor 202 which may include one or more permanent magnets. The one or more permanent magnets on the rotor 202 may include four poles; alternatively the permanent magnet may include two, six, or another number of poles. The motor may also include a stator 204. The stator 204 may be positioned around the rotor 202, and may include a plurality of electromagnets 206. For example, there may be six electromagnets 206 on the stator 204, which may operate as three pairs of electromagnets 206. Each pair 302, 304, 306 of electromagnets may be positioned opposite one another. The plurality of electromagnets 206 may be evenly distributed around the stator 204.

The method may be implemented by logic 402 comprised in the motor assembly 100. For example, the logic 402 (which implements the method described herein) may comprise a processor, e.g., a microcontroller, executing instructions comprised on a memory medium; a state-machine based digital controller; and/or a mixed signal application specific integrated circuit (ASIC). Alternatively, the method may be implemented by any combination of the above.

In 502, one or more pairs of electromagnets may be excited at a first excitation level. The one or more pairs of electromagnets may be less than all of the plurality of electromagnets. For example, in one embodiment, only a first pair of electromagnets may be excited. This may be more efficient than using more than one pair of electromagnets, since it may require less power, however, more than one pair of electromagnets may be excited if desired. The first pair of electromagnets may be excited by pulse-width modulation (PWM), or alternatively, may be excited by linear voltages. Thus, the first excitation level (and any subsequent excitation levels) may be either PWM duty cycles, or linear voltage levels.

In some embodiments, the motor may have optimal or practical minimum and/or maximum excitation levels. For example, there may be a minimum PWM duty cycle and a maximum PWM duty cycle, or minimum and maximum linear voltages, with which the electromagnetic coils may (or should) be driven. In some embodiments, the first excitation level may be a minimum excitation level; in other words, the method may begin my exciting a single pair of electromagnets at a minimum excitation level.

In 504, the excitation of the one or more pairs of electromagnets may be increased to a second excitation level. The increase may occur over a first period of time. Increasing the excitation level to the second excitation level may include incrementing the excitation level through one or more intermediate excitation levels over the first period of time. For example, the one or more pairs of electromagnets may first be excited at the first excitation level, then after a first time increment, the excitation level may be incremented to a first intermediate excitation level. After a second time increment, the excitation level might again be incremented, e.g., to a second intermediate excitation level. As many such incremental increases in excitation level may be performed as are desired, e.g., for a smoother increase in excitation. The increment levels, and time increments, may be as small or as large as desired. Alternatively, only one, or no intermediate incrementations may be performed, if desired. Thus, in some embodiments, increasing the excitation level to the second excitation level may be done in a single increment.

The second excitation level may be higher than the first excitation level. In some embodiments, the second excitation level may be a maximum excitation level, e.g., a maximum optimal or practical PWM duty cycle or linear voltage.

In 506, the excitation of the one or more pairs of electromagnets may be decreased to a third excitation level. The decrease may occur over a second period of time. Decreasing the excitation level to the second excitation level may include decrementing the excitation level through one or more intermediate excitation levels over the second period of time. Such decrementation may be similar to the incrementation described above with respect to step 504. For example, in the second period of time, the one or more pairs of electromagnets may at first be excited at the second excitation level, then after a first time increment, the excitation level may be decremented to a first intermediate excitation level. After a second time increment, the excitation level might again be decremented, e.g., to a second intermediate excitation level. As many such incremental decreases in excitation level may be performed as are desired, e.g., for a smoother decrease in excitation. The decrement levels, and time increments, may be as small or as large as desired. Alternatively, only one, or no intermediate decrementations may be performed, if desired. Thus, in some embodiments, decreasing the excitation level to the third excitation level may be done in a single decrement.

The third excitation level may be lower than the second excitation level. In some embodiments, the third excitation level may be a minimum excitation level, e.g., a minimum optimal or practical PWM duty cycle or linear voltage. Thus, in some embodiments, the excitation of the one or more pairs of electromagnets may initially be a minimal excitation level, than may gradually be increased to a maximum level, than decreased again to a minimum excitation level. In this way, the rotor may be induced to move from any unknown position to a known position relatively quickly (by achieving the maximum excitation level) but efficiently (by beginning and ending at a minimum excitation level, i.e., not using maximal excitation for the entire alignment process).

An additional advantage of the method described above over prior art methods (which typically involve turning the electromagnetic coils off directly from a maximum excitation level) may include increased accuracy of the alignment process. For example, some prior art literature describes slight movement of the rotor after the coils are shut off from a maximum excitation level. Such movement of the rotor after the alignment process is typically negligible or nonexistent if the excitation level is reduced to a minimum before turning off the electromagnetic coils, as performed in the methods described herein.

Figure 6:
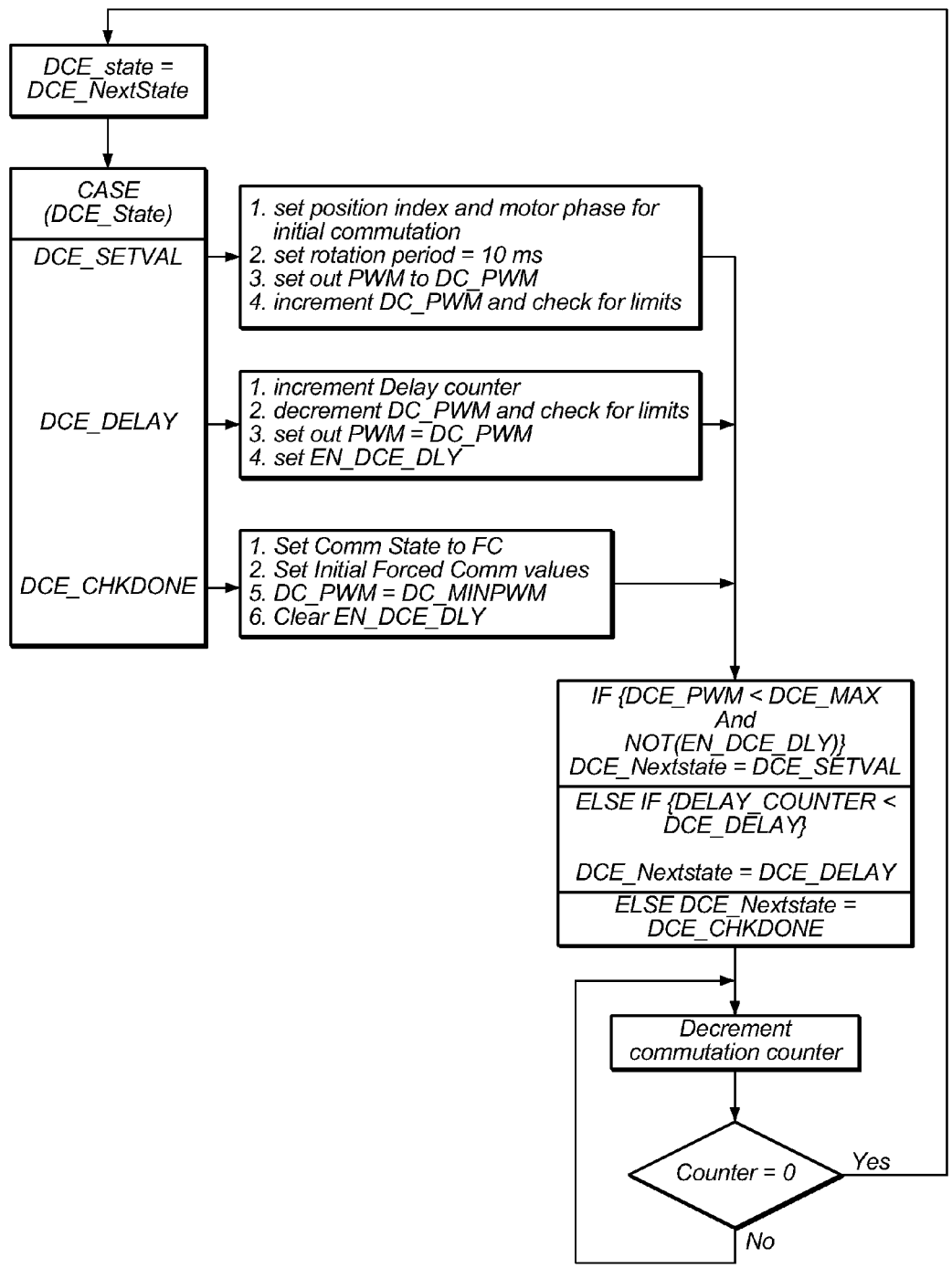
FIG. 6 illustrates a finite state machine implementation of a method for aligning a rotor in a motor according to one embodiment.

FIG. 6—Finite State Machine Based Implementation of a Method for Aligning a Rotor in a Motor FIG. 6 shows an exemplary embodiment of one possible implementation of a method for aligning a rotor in a motor. The state diagram portion shown in FIG. 6 may be implemented as part of a finite state machine based digital controller for controlling operation of a motor, according to some embodiments. For example, FIG. 6 might control the rotor alignment function of a finite state machine which also includes one or more of portions for forced commutation, natural commutation, motor braking (such as the portion shown in FIG. 8), a halt/restart sequence, stall detection, and/or other functions. It should be noted that the state diagram implementation of FIG. 6 represents one possible implementation of the method shown in and described with respect to FIG. 5, and is intended to be exemplary only; other implementations are also envisioned.

Figure 7:
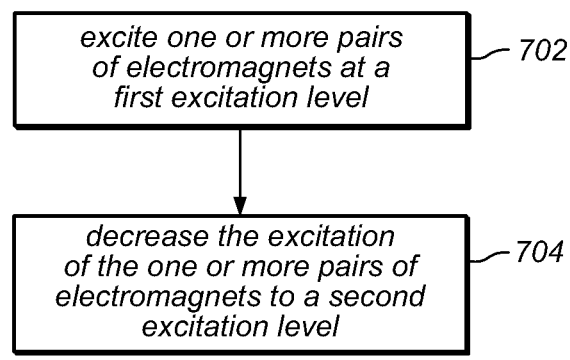
FIG. 7 is a flowchart diagram describing a method for stopping a rotor in a motor according to one embodiment.

FIG. 7—Flowchart Illustrating a Method for Stopping and Aligning a Rotor in a Motor FIG. 5 illustrates a method for stopping and aligning a rotor in a motor according to one embodiment. Much as the method described above for aligning a rotor in a motor, embodiments of the method described below may be particularly suitable for implementation in a sensorless, brushless, three phase DC electric motor. The method described below is similar to the method described above for aligning a rotor in a motor, but may be more suitable to stopping (e.g., braking) a motor that is already moving. For example, in some situations it may be desirable to stop the rotation of the rotor in a motor more quickly than it would if simply allowed to come to rest naturally; in this case, it may be desirable to not only stop the rotor, but also to place the rotor in a known position to facilitate a more efficient start-up (e.g., forced commutation) phase for the next time it is desired that the motor operate. As with the method for aligning a rotor in a motor described above with respect to FIG. 5, although the method described below may be particularly suitable in a sensorless motor, it will be apparent that the technique may also be used in other types of motors if desired. That is to say, in many cases initiating rotation may be performed more efficiently if the rotor begins in a particular, known position, and accordingly it may be desirable to stop the rotor in a known position when applying a brake, for a variety of types of motor.

The motor 102 may be a brushless, three-phase motor as described above and illustrated in the various Figures. The motor 102 may thus include a rotor 202 which may include one or more permanent magnets. The one or more permanent magnets on the rotor 202 may include four poles; alternatively the permanent magnet may include two, six, or another number of poles. The motor may also include a stator 204. The stator 204 may be positioned around the rotor 202, and may include a plurality of electromagnets 206. For example, there may be six electromagnets 206 on the stator 204, which may operate as three pairs of electromagnets 206. Each pair 302, 304, 306 of electromagnets may be positioned opposite one another. The plurality of electromagnets 206 may be evenly distributed around the stator 204.

The method may be implemented by logic 402 comprised in the motor assembly 100. For example, the logic 402 (which implements the method described herein) may comprise a processor, e.g., a microcontroller, executing instructions comprised on a memory medium; a state-machine based digital controller; and/or a mixed signal application specific integrated circuit (ASIC). Alternatively, the method may be implemented by any combination of the above.

In 702, one or more pairs of electromagnets may be excited at a first excitation level. The one or more pairs of electromagnets may be less than all of the plurality of electromagnets. For example, in one embodiment, only a first pair of electromagnets may be excited. This may be more efficient than using more than one pair of electromagnets, since it may require less power, however, more than one pair of electromagnets may be excited if desired. The first pair of electromagnets may be excited by pulse-width modulation (PWM), or alternatively, may be excited by linear voltages. Thus, in some embodiments, the first excitation level (and any subsequent excitation levels) may be either PWM duty cycles, or linear voltage levels.

In some embodiments, the motor may have optimal or practical minimum and/or maximum excitation levels. For example, there may be a minimum PWM duty cycle and a maximum PWM duty cycle, or minimum and maximum linear voltages, with which the electromagnetic coils may (or should) be driven. In some embodiments, the first excitation level may be a maximum excitation level; in other words, the method may begin my exciting a single pair of electromagnets at a maximum excitation level. This may effect a more rapid stop of the rotor than a lower excitation level.

The one or more pairs of electromagnets may be excited at the first excitation level for a first period of time. The first period of time may be a pre-determined (e.g., a programmed) amount of time, or may be a variable amount of time. For example, in some embodiments it may be simpler to implement the first period of time as a set amount of time, which may be determined based on properties of the motor (e.g., motor design, materials, etc.) and/or the load being driven, as being an optimal amount of time at which to drive the one or more pairs of electromagnets at maximum excitation in order to bring the rotor to a stop. In other embodiments, it may be desirable to allow a variable first period of time; for example, it may be more efficient and safer for the motor to detect the rotational velocity of the rotor using BEMF detection until the rotor drops below a certain threshold velocity, or until a BEMF signal can no longer be detected, and to drive the one or more electromagnets at the first excitation level only until such a condition has been met. The first period of time may be determined based on any of various factors, in addition to or instead of those described above, as desired.

In 704, the excitation of the one or more pairs of electromagnets may be decreased to a second excitation level. The decrease may occur over a second period of time. Decreasing the excitation level to the second excitation level may include decrementing the excitation level through one or more intermediate excitation levels over the second period of time. For example, in the second period of time, the one or more pairs of electromagnets may at first be excited at the first excitation level, then after a first time increment, the excitation level may be decremented to a first intermediate excitation level. After a second time increment, the excitation level might again be decremented, e.g., to a second intermediate excitation level. As many such incremental decreases in excitation level may be performed as are desired, e.g., for a smoother decrease in excitation. The decrement levels, and time increments, may be as small or as large as desired. Alternatively, only one, or no intermediate decrementations may be performed, if desired. Thus, in some embodiments, decreasing the excitation level to the second excitation level may be done in a single decrement.

The second excitation level may be lower than the first excitation level. In some embodiments, the second excitation level may be a minimum excitation level, e.g., a minimum optimal or practical PWM duty cycle or linear voltage. Thus, in some embodiments, the excitation of the one or more pairs of electromagnets may initially be held at a maximum excitation level, than decreased to a minimum excitation level. In this way, the rotor may be induced to stop at a known position relatively quickly (by achieving the maximum excitation level) and in such a way as to facilitate more efficient start-up when it is again desired that the rotor turn (by exciting less than all of the electromagnet pairs).

The method may share the additional advantage of the method shown in and described with respect to FIG. 5 over prior art methods wherein the accuracy of the alignment of the rotor is increased by the decreasing of the excitation level before turning off the coils.

Figure 8:
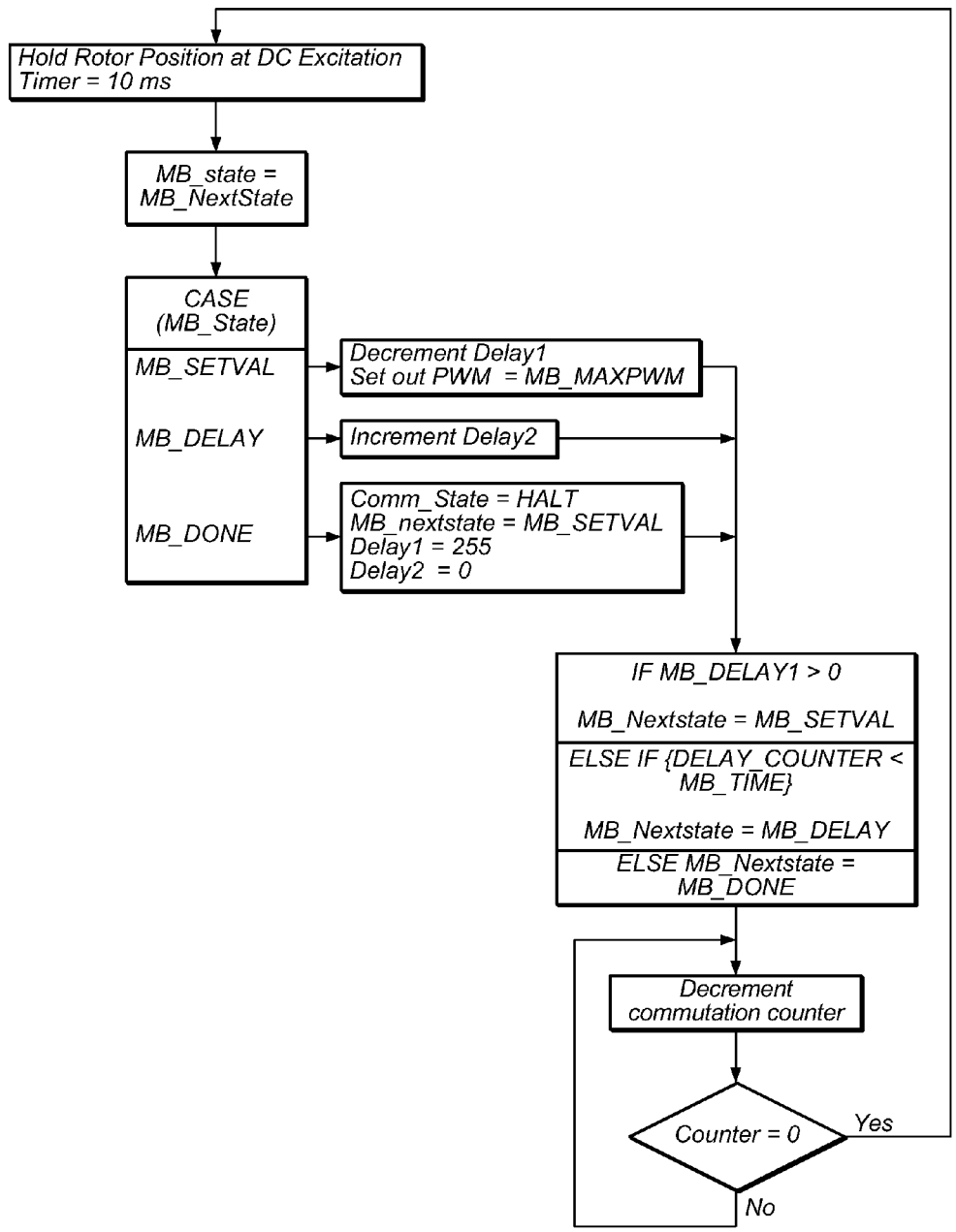
FIG. 8 illustrates a finite state machine implementation of a method for stopping and aligning a rotor in a motor according to one embodiment.

FIG. 8—Finite State Machine Based Implementation of a Method for Stopping and Aligning a Rotor in a Motor FIG. 8 shows an exemplary embodiment of one possible implementation of a method for stopping and aligning a rotor in a motor. The state diagram portion shown in FIG. 8 may be implemented as part of a finite state machine based digital controller for controlling operation of a motor, according to some embodiments. For example, FIG. 8 might control the motor braking function of a finite state machine which also includes one or more of portions for rotor alignment (such as the portion shown in FIG. 6), forced commutation, natural commutation, a halt/restart sequence, stall detection, and/or other functions. It should be noted that the state diagram implementation of FIG. 6 represents one possible implementation of the method shown in and described with respect to FIG. 5, and is intended to be exemplary only; other implementations are also envisioned.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for aligning a rotor in a motor, wherein the motor comprises the rotor and a plurality of pairs of electromagnets, the method comprising:

exciting one or more pairs of electromagnets of the plurality of pairs of electromagnets at a first excitation level, wherein the one or more pairs of electromagnets is less than all of the plurality of pairs of electromagnets;

increasing, over a first period of time, the excitation of the one or more pairs of electromagnets to a second excitation level, wherein the second excitation level is a higher excitation level than the first excitation level;

decreasing, over a second period of time, the excitation of the one or more pairs of electromagnets to a third excitation level, wherein the third excitation level is a lower excitation level than the second excitation level;

wherein the motor is configured to induce rotation of the rotor by exciting the plurality of pairs of electromagnets according to a commutation pattern, wherein the one or more pairs of electromagnets are not commutated during the first and second periods of time;

wherein said exciting, increasing, and decreasing causes the rotor to stop in a known position.

2. The method of claim 1,
wherein said increasing comprises incrementing the excitation level of the one or more pairs of electromagnets through one or more intermediate excitation levels over the first period of time.

3. The method of claim 1,
wherein said decreasing comprises decrementing the excitation level of the one or more pairs of electromagnets through one or more intermediate excitation levels over the second period of time.

4. The method of claim 1, wherein the first, second and third excitation levels are one of:
pulse width modulation duty cycles; or
linear voltages.

5. The method of claim 1,
wherein the one or more pairs of electromagnets of the plurality of pairs of electromagnets comprise only a first pair of electromagnets of the plurality of pairs of electromagnets.

6. The method of claim 1,
wherein the motor is a three phase motor, wherein the plurality of pairs of electromagnets comprise three pairs of electromagnets.

7. The method of claim 1,
wherein the motor does not include discrete sensing elements for detecting rotor position, wherein stopping the rotor in the known position aligns the rotor for a forced commutation start-up of the motor.

8. The method of claim 1,
wherein the motor is configured to detect rotor position using an undriven stator electromagnet to indirectly detect the rotor position, wherein stopping the rotor in the known position aligns the rotor for a forced commutation start-up of the motor.

9. A non-transitory computer readable memory medium, comprising program instructions executable to align a rotor in a motor, wherein the motor comprises the rotor and a plurality of pairs of electromagnets, wherein the program instructions are executable to:
excite one or more pairs of electromagnets of the plurality of pairs of electromagnets at a first excitation level, wherein the one or more pairs of electromagnets is less than all of the plurality of pairs of electromagnets;
increase, over a first period of time, the excitation of the one or more pairs of electromagnets to a second excitation level, wherein the second excitation level is a higher excitation level than the first excitation level;
decrease, over a second period of time, the excitation of the one or more pairs of electromagnets to a third excitation level, wherein the third excitation level is a lower excitation level than the second excitation level;
wherein the motor is configured to induce rotation of the rotor by exciting the plurality of pairs of electromagnets according to a commutation pattern, wherein the one or more pairs of electromagnets are not commutated during the first and second periods of time;
wherein said exciting, increasing, and decreasing causes the rotor to stop in a known position.

10. The computer readable memory medium of claim 9, wherein the program instructions executable to increase the excitation of the one or more pairs of electromagnets to the second excitation level are executable to:
increment the excitation level of the one or more pairs of electromagnets through one or more intermediate excitation levels over the first period of time.

11. The computer readable memory medium of claim 9, wherein the program instructions executable to decrease the excitation of the one or more pairs of electromagnets to the third excitation level are executable to:
decrement the excitation level of the one or more pairs of electromagnets through one or more intermediate excitation levels over the second period of time.

12. The computer readable memory medium of claim 9, wherein the first, second, and third excitation levels are one of:
pulse width modulation duty cycles; or
linear voltages.

13. The computer readable memory medium of claim 9,
wherein the one or more pairs of electromagnets of the plurality of pairs of electromagnets comprise only a first pair of electromagnets of the plurality of pairs of electromagnets.

14. The computer readable memory medium of claim 9,
wherein the motor is a three phase motor, wherein the plurality of pairs of electromagnets comprise three pairs of electromagnets.

15. A chip, comprising logic configured to align a rotor in a motor, wherein the motor comprises the rotor and a plurality of pairs of electromagnets, wherein the logic is configured to:
excite one or more pairs of electromagnets of the plurality of pairs of electromagnets at a first excitation level, wherein the one or more pairs of electromagnets is less than all of the plurality of pairs of electromagnets;
increase, over a first period of time, the excitation of the one or more pairs of electromagnets to a second excitation level, wherein the second excitation level is a higher excitation level than the first excitation level;
decrease, over a second period of time, the excitation of the one or more pairs of electromagnets to a third excitation level, wherein the third excitation level is a lower excitation level than the second excitation level;
wherein the motor is configured to induce rotation of the rotor by exciting the plurality of pairs of electromagnets according to a commutation pattern, wherein the one or more pairs of electromagnets are not commutated during the first and second periods of time;
wherein said exciting, increasing, and decreasing causes the rotor to stop in a known position.

16. The chip of claim 15, wherein the logic configured to increase the excitation of the one or more pairs of electromagnets to the second excitation level is configured to:
increment the excitation level of the one or more pairs of electromagnets through one or more intermediate excitation levels over the first period of time.

17. The chip of claim 15, wherein the logic configured to decrease the excitation of the one or more pairs of electromagnets to the third excitation level is configured to:
decrement the excitation level of the one or more pairs of electromagnets through one or more intermediate excitation levels over the second period of time.

18. The chip of claim 15, wherein the first, second and third excitation levels are one of:
pulse width modulation duty cycles; or
linear voltages.

19. The chip of claim 15,
wherein the one or more pairs of electromagnets of the plurality of pairs of electromagnets comprise only a first pair of electromagnets of the plurality of pairs of electromagnets.

20. The chip of claim 15, wherein the motor is a three phase motor, wherein the plurality of pairs of electromagnets comprise three pairs of electromagnets.

21. An electronic motor, comprising:
a rotor comprising a permanent magnet;
a stator comprising a plurality of pairs of electromagnets;
logic configured to:
- excite one or more pairs of electromagnets of the plurality of pairs of electromagnets at a first excitation level, wherein the one or more pairs of electromagnets is less than all of the plurality of pairs of electromagnets;
- increase, over a first period of time, the excitation of the one or more pairs of electromagnets to a second excitation level, wherein the second excitation level is a higher excitation level than the first excitation level;
- decrease, over a second period of time, the excitation of the one or more pairs of electromagnets to a third excitation level, wherein the third excitation level is a lower excitation level than the second excitation level;

wherein the motor is configured to induce rotation of the rotor by exciting the plurality of pairs of electromagnets according to a commutation pattern, wherein the one or more pairs of electromagnets are not commutated during the first and second periods of time;
wherein said exciting, increasing, and decreasing causes the rotor to stop in a known position.

* * * * *